United States Patent [19]
Toda et al.

[11] Patent Number: 5,178,442
[45] Date of Patent: Jan. 12, 1993

[54] BRAKE PRESSURE CONTROLLING APPARATUS

[75] Inventors: Hiroshi Toda, Kariya City; Hiroaki Takeuchi, Toyota City, both of Japan

[73] Assignee: Aisin Seiki Kabushiki Kaisha, Kariya City, Japan

[21] Appl. No.: 730,541

[22] Filed: Mar. 28, 1991

[30] Foreign Application Priority Data

Mar. 30, 1990 [JP] Japan .................................. 2-85252

[51] Int. Cl.$^5$ ............................................... B60T 8/32
[52] U.S. Cl. ................................... 303/116.1; 303/9.62; 303/111; 303/119 R; 303/DIG. 6; 303/9.63; 303/92; 303/113.5; 303/119.1; 303/901
[58] Field of Search ........ 303/116 R, 113 R, 113 TR, 303/113 SS, 113 TB, 113 AP, 114 R, 114 PB, 114 PN, 10–12, 22.1, 100, 68–69, 61–63, 110, 111, 117, 118, 92, 119 R, 119 SV, DIG. 5, DIG. 6, 116 SP, 116 WP, 116 PC, 115 PP, 9.62; 188/349, 181 A

[56] References Cited

U.S. PATENT DOCUMENTS

| | | | |
|---|---|---|---|
| 3,674,317 | 7/1972 | Mangold | 303/22.1 X |
| 4,416,347 | 11/1983 | Bertling et al. | 303/113 T R |
| 4,418,966 | 12/1983 | Hattwig | 303/119 R X |
| 4,462,642 | 7/1984 | Leiber | 303/116 R |
| 4,664,452 | 5/1987 | Kubota et al. | 303/DIG. 3 |
| 4,720,151 | 1/1988 | Belart et al. | 303/111 X |
| 4,744,610 | 5/1988 | Arikawa | |
| 4,750,788 | 6/1988 | Seibert et al. | 303/111 |
| 4,752,104 | 6/1988 | Miyake | 303/111 X |
| 4,805,967 | 2/1989 | Arikawa | 303/113 A P |
| 4,807,943 | 2/1989 | Ogino | 303/68 X |
| 4,824,189 | 4/1989 | Burgdorf | 303/113 TR |
| 4,842,343 | 6/1989 | Akiyoshi et al. | 303/68 X |
| 4,844,558 | 7/1989 | Ishii et al. | 303/116 R |
| 4,898,430 | 2/1990 | Becker-Endrigkeid et al. | 303/113 TR |
| 4,930,846 | 6/1990 | Miyake et al. | 303/111 |
| 4,940,293 | 7/1990 | Burckhardt et al. | 303/116 R |
| 4,943,123 | 7/1990 | Takada et al. | 303/9.62 X |
| 5,125,721 | 6/1992 | Schmidt et al. | 303/116 R X |

FOREIGN PATENT DOCUMENTS

| | | | |
|---|---|---|---|
| 0368359 | 5/1990 | European Pat. Off. | 303/111 |
| 0132449 | 5/1989 | Japan | 303/119 SV |
| 0128951 | 5/1990 | Japan | 303/113 AP |

*Primary Examiner*—Douglas C. Butler
*Attorney, Agent, or Firm*—Burns, Doane, Swecker & Mathis

[57] ABSTRACT

A brake pressure control apparatus having a master cylinder, a front wheel cylinder and a rear wheel cylinder is provided with a brake circuit for connecting the master cylinder to the front wheel cylinder, a normally open valve unit arranged in series with respect to the brake circuit, a return circuit arranged in parallel with respect to the brake circuit, a normally closed valve unit installed in the return circuit, a reservoir unit installed in the return circuit and a pump unit installed in the return circuit. A controlling unit is provided for controlling the operations of the normally open valve unit, the normally closed valve unit and the pump unit so as to regulate the brake pressure. A cut off valve unit is interconnected between the master cylinder and the rear wheel cylinder for cutting off the rear wheel cylinder from the master cylinder while the controlling unit regulates the brake pressure. When the controlling unit is not regulating the brake pressure, the brake pressure is applied from the master cylinder to both the front and rear cylinders. Thus, the front and the rear wheels are braked. When the controlling unit regulates the brake pressure, the cut off valve unit is closed in order to cut off the rear wheel cylinder from the master cylinder.

7 Claims, 4 Drawing Sheets

BRAKE PRESSURE CONTROLLING APPARATUS

FIELD OF THE INVENTION

The present invention relates to a brake pressure controlling apparatus and more particularly, to a brake pressure controlling apparatus for a wheeled vehicle.

BACKGROUND OF THE INVENTION

One example of a conventional brake pressure control apparatus is disclosed in U.S. Pat. No. 4,744,610, issued on May 17, 1988. The conventional apparatus disclosed in that patent includes a brake circuit for connecting a master cylinder to a front wheel cylinder, a normally open valve unit installed in series in the brake circuit, a return circuit connected in parallel to the brake circuit and a normally closed valve unit installed on the return circuit. Additionally, a reservoir unit and a pump unit are installed in the return circuit and a controlling unit is provided for controlling the operations of the normally open valve unit, the normally closed valve unit and the pump unit. A regulating valve unit is connected to the front wheel cylinder for regulating the pressure applied to the rear wheel cylinder in response to the pressure applied to the front wheel cylinder.

In the aforementioned conventional apparatus, the pump unit must return the brake fluid from the front and rear wheel cylinders to the master cylinder. Therefore, the pump unit must have a large capacity in order to return the required quantity of brake fluid. Unfortunately, the large pump unit is difficult to install in the vehicle due to space limitations. Moreover, from a cost standpoint, the large pump can be disadvantageous. Further, when the brake pressure is increased in the front wheel cylinder, the brake pressure is also increased in the rear wheel cylinder. Therefore, the brake pressure increases gradually in the front and the rear wheel cylinders, and thus, brake pressure response is deteriorated.

SUMMARY OF THE INVENTION

Accordingly, one of the objects of the present invention is to obviate the aforementioned drawbacks associated with conventional brake pressure control apparatus.

Another object of the present invention is to provide a brake pressure controlling apparatus that permits the use of a pump unit having a small capacity.

An additional object of the present invention is to provide a brake pressure controlling apparatus that is able to improve brake pressure response for the front wheel cylinder.

To achieve at least the aforementioned objects, a brake pressure control apparatus having a master cylinder, a front wheel cylinder and a rear wheel cylinder includes a brake circuit for connecting the master cylinder to the front wheel cylinder, a normally open valve unit arranged in series with respect to the brake circuit, a return circuit connected in parallel with respect to the brake circuit, a normally closed valve unit installed in the return circuit, a reservoir unit installed in the return circuit, a pump unit installed in the return circuit, a controlling unit for controlling the operations of the normally open valve unit, the normally closed valve unit and the pump unit so as to regulate the brake pressure, and a cut off valve unit interconnected between the master cylinder and the rear wheel cylinder for cutting off the rear wheel cylinder from the master cylinder while the controlling unit regulates the brake pressure.

When the controlling unit is not controlling the operations of the normally open valve unit, the normally closed valve unit and the pump unit, the brake pressure is applied from the master cylinder to both the front and the rear cylinders. Thus, the front and the rear wheels are braked.

When the controlling unit is in operation so as to control the operations of the normally open valve unit, the normally closed valve unit and the pump unit, the cut off valve unit is closed in order to cut off the rear wheel cylinder from the master cylinder. As a result, the brake pressure can be rapidly increased only in the front wheel cylinder, thereby improving the pressure response. The brake pressure is not increased in the rear wheel cylinder, but the braking ability is not significantly affected since the rear wheel cylinder does not contribute as much to the braking ability of the vehicle.

Preferably, the brake pressure control apparatus also includes a connecting circuit for connecting the rear wheel cylinder to the front cylinder, and a one-way valve unit for conducting the brake pressure from the rear wheel cylinder to the front wheel cylinder.

When the brake pressure is decreased in the front wheel cylinder, the brake pressure is also decreased in the rear wheel cylinder since the connecting circuit connects the rear wheel cylinder to the front wheel cylinder. In contrast, when the brake pressure is increased in the front wheel cylinder, the brake pressure is not increased in the rear wheel cylinder, since the one-way valve unit closes the connecting circuit. Thus, a low pressure is maintained in the rear wheel cylinder so as to prevent the rear wheels from locking.

As described above, although it may not be possible to optimize the brake pressure in the rear wheel cylinder, both the front and the rear wheels are not effectively locked. Further, the brake pressure in the front wheel cylinder can be increased rapidly with a small quantity of brake fluid since the brake fluid is not supplied to the rear wheel cylinder. Thus, in accordance with the present invention, a small and relatively inexpensive pump unit can be employed.

BRIEF DESCRIPTION OF THE DRAWINGS

The features of the brake pressure control apparatus according to the present invention will be more clearly understood from the following description considered in conjunction with the drawing figures in which like elements bear like reference numerals and wherein.

DETAILED EXPLANATION OF THE PREFERRED EMBODIMENTS

Figure 1:
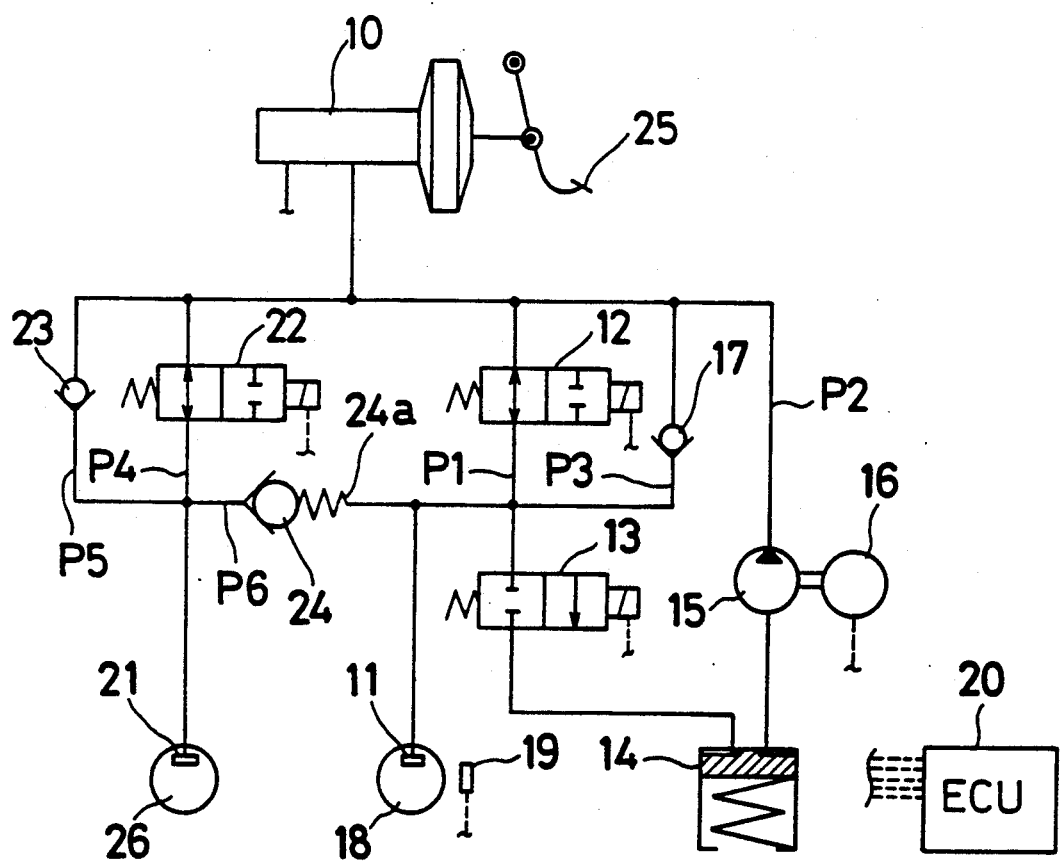
FIG. 1 is a circuit diagram showing the first embodiment of the present invention.

Referring now to FIG. 1, the first embodiment of the present invention will be explained. In FIG. 1, only one brake line is shown, but it is to be understood that two or more brake lines are usually included in a vehicle brake system.

The apparatus includes a master cylinder 10, a front wheel cylinder 11 and a rear wheel cylinder 21. The master cylinder 10 includes a brake pedal 25. The front wheel cylinder 11 is provided on a front wheel 18 and the rear wheel cylinder 21 is provided on a rear wheel 26. The master cylinder 10 is connected to the front wheel cylinder 11 by a front brake circuit P1 and a normally open valve unit 12 is installed in the front brake circuit P1. Preferably, the valve unit 12 is an electromagnetic valve for opening and closing the front brake circuit P1. Returning circuits P2 and P3 are also provided and are arranged in parallel with respect to the front circuit P1. The returning circuit P3 is provided in order to eject the pressurized brake fluid from the front wheel cylinder 11 when the brake pedal 25 is released.

A normally closed valve unit 13, a reservoir unit 14 and a pump unit 15 are installed in the returning circuit P2. The pump unit 15 is driven by a motor 16. A one-way valve unit 17 is installed in the returning circuit P3. The valve units 12, 13 and the motor 16 are driven by an electronic control unit 20. The electronic control unit 20 executes a conventional control program based on the wheel speed detected by a sensor 19. Alternatively, the valve unit 12 may be integrated with the valve unit 13.

Further, the master cylinder 10 is connected to the rear wheel cylinder 21 by a rear brake circuit P4 and a normally open valve unit 22 is installed in the rear brake circuit P4.

A returning circuit P5 is arranged in parallel with respect to the valve unit 22. The returning circuit P5 is provided in order to eject the pressurized brake fluid from the rear wheel cylinder 21 when the brake pedal 25 is released. A one-way valve unit 23 is installed in the returning circuit P5. The valve unit 22 is driven by the electronic control unit 20. The electronic control unit 20 closes the valve unit 22 while the electronic control unit 20 controls the valve units 12, 13 and the motor 16. In other words, the valve unit 22 is closed while the brake pressure is regulated in the front wheel cylinder 11.

A connecting circuit P6 is provided and connects the rear wheel cylinder 21 with the front wheel cylinder 21. A one-way valve unit 24 is installed in the connecting circuit P6. The one-way valve unit 24 only conducts pressure from the rear wheel cylinder 21 to the front wheel cylinder 11. The one-way valve unit 24 includes a bias spring 24a for releasing excessive pressure in the rear wheel cylinder 21.

When the pedal 25 is depressed by a vehicle driver, the master cylinder 10 pressurizes the brake fluid. The pressure of the brake fluid is transmitted to the front and rear wheel cylinders 11, 21 through the front and rear brake circuits P1, P4 in order to brake the wheels 18, 26. This situation continues until the electronic control unit 20 controls the valve units 12, 13 and the motor 16. That is to say, this situation continues until just before the brake pressure (W/Cf) is regulated in the front wheel cylinder 11. This situation is shown by line (o-a) in FIG. 2.

Figure 2:
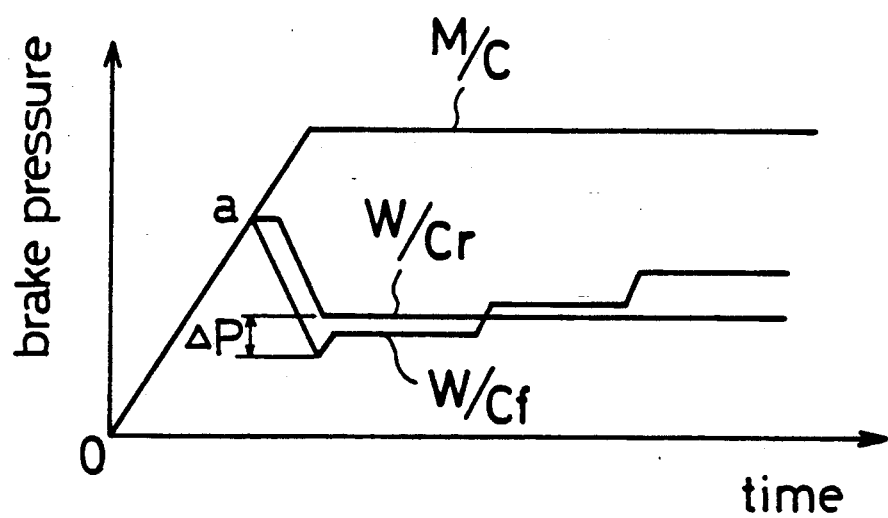
FIG. 2 is a graph showing brake pressure changes.

When the electronic control unit 20 begins regulation of the brake pressure (W/Cf) in the front wheel cylinder 11, i.e., at the moment (a) in FIG. 2, the normally open valve unit 22 is closed by the electronic control unit 20 in order to cut off the rear wheel cylinder 21 from the master cylinder 10.

When the brake pressure (W/Cf) is decreased in the front wheel cylinder 11, i.e., when the valve unit 12 is closed and the valve unit 13 is opened, the pressurized brake fluid is ejected from the front wheel cylinder 11 to the reservoir 14 through the valve unit 13. At the same time, the pressurized brake fluid is also ejected from the rear wheel cylinder 21 to the reservoir 14 through the valve unit 13. Thus, as shown in FIG. 2, the brake pressure (W/Cr) is decreased in accordance with decreasing brake pressure in the front wheel cylinder 11. Compared to the brake pressure (W/Cf), the brake pressure (W/Cr) is delayed a moment which corresponds to a biased pressure ($\Delta P$). The biased pressure ($\Delta P$) is determined by the offset spring 24a. Therefore, if the one-way valve unit does not include the offset spring 24a, the brake pressure (W/Cr) is decreased substantially the same as the decrease in the brake pressure (W/Cf).

After decreasing the brake pressure, the electronic control unit 20 increases the brake pressure (W/Cf) in the front wheel cylinder 11. While the valve unit 12 is opened and the valve unit 13 is closed, the pressurized brake fluid is supplied from the pump unit 15 to the front wheel cylinder 11 through the valve unit 12. Thus, the brake pressure (W/Cf) is increased. However, the pressurized brake fluid is not supplied to the rear wheel cylinder 21 since the one-way valve unit 24 prevents the brake fluid from flowing in that direction. Thus, the brake pressure (W/Cr) is not increased, but is maintained at a low pressure.

During the pressure increasing period of time, as shown in FIG. 2, the brake pressure (W/Cf) may be maintained in the front wheel cylinder 11. In other words, the valve units 12, 13 may be closed together at the same time under some conditions. Under such conditions, the brake pressures (W/Cf, W/Cr) are maintained at their respective pressures.

As described above, in the first embodiment the brake pressure (W/Cr) is decreased in the rear wheel cylinder 21 by a connecting circuit P6, while the brake pressure (W/Cf) is decreased in the front wheel cylinder 11. Further, in the first embodiment the brake pressure (W/Cr) is maintained at a low pressure in the rear wheel cylinder 21, while the brake pressure (W/Cf) is increased in the front wheel cylinder 11 by the electronic control unit 20. Therefore, while the brake pressure (W/Cr) may not be optimized in the rear wheel cylinder 21, the rear wheel 18 does not become locked. In addition to the above features, the brake pressure (W/Cf) can be rapidly increased since the rear wheel cylinder 21 is cut off from the front wheel cylinder 11. Therefore, the capacity of the pump unit 15 can be minimized, thereby permitting the use of a smaller pump unit 15. As a result, the cost associated with the pump unit 15 can be reduced.

Figure 3:
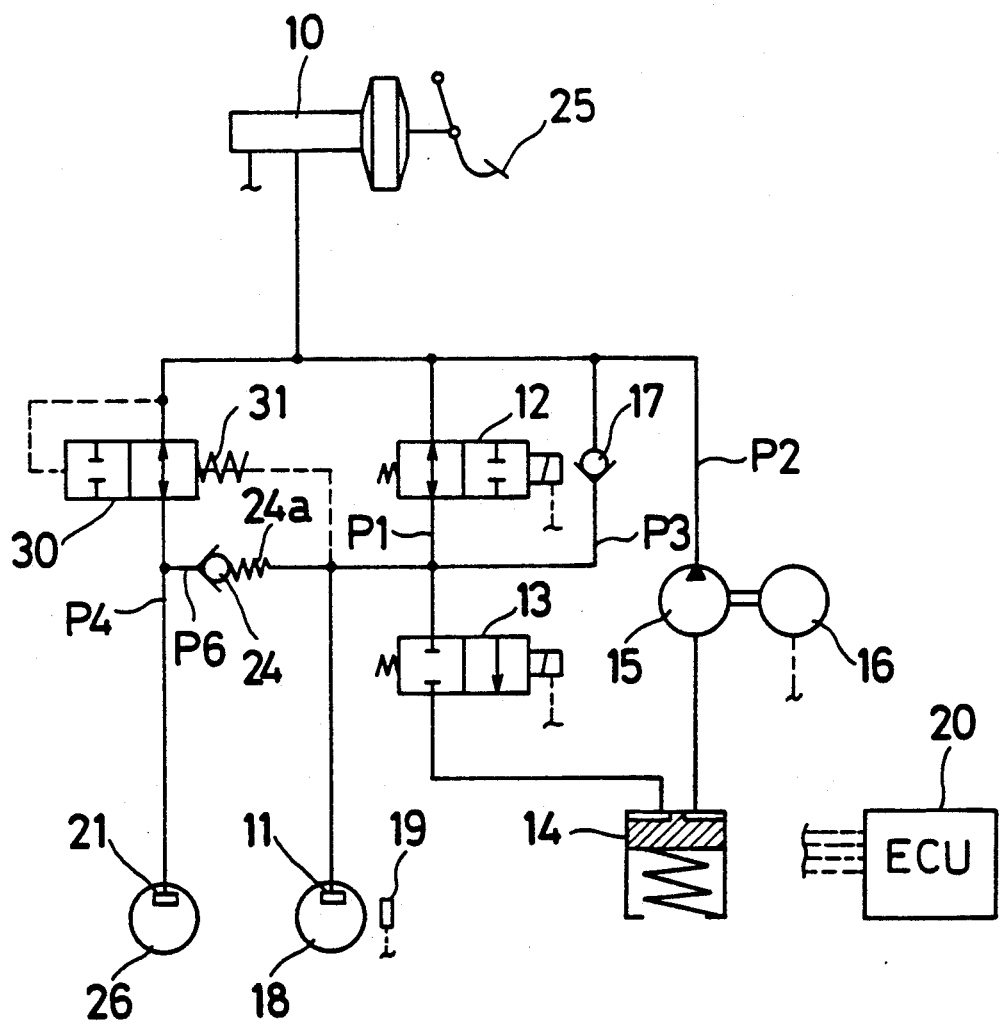
FIG. 3 is a circuit diagram showing a second embodiment of the present invention.

Referring now to FIG. 3, the second embodiment of the present invention will be explained. In the second embodiment, a regulating valve unit 30 is installed in the rear brake circuit P4 instead of the valve unit 22 and the one-way valve unit 23 which are used together in the first embodiment.

The regulating valve unit 30 includes a normally open valve and a bias spring 31. The regulating valve unit 30 closes the rear brake circuit P4 when a predetermined pressure, which is determined by the bias spring 31, is exceeded by the pressure differential between the output pressure (M/C) of the master cylinder 19 and the brake pressure (W/Cf) in the front wheel cylinder 11. In the second embodiment, the predetermined pressure is established at a low value. The other features and the operation of the second embodiment are substantially the same as in the first embodiment. Therefore, for purposes of simplicity, a detailed explanation of the other features of the second embodiment is omitted by using the same reference numerals for elements that correspond to those already described in connection with the first embodiment.

Figure 4:
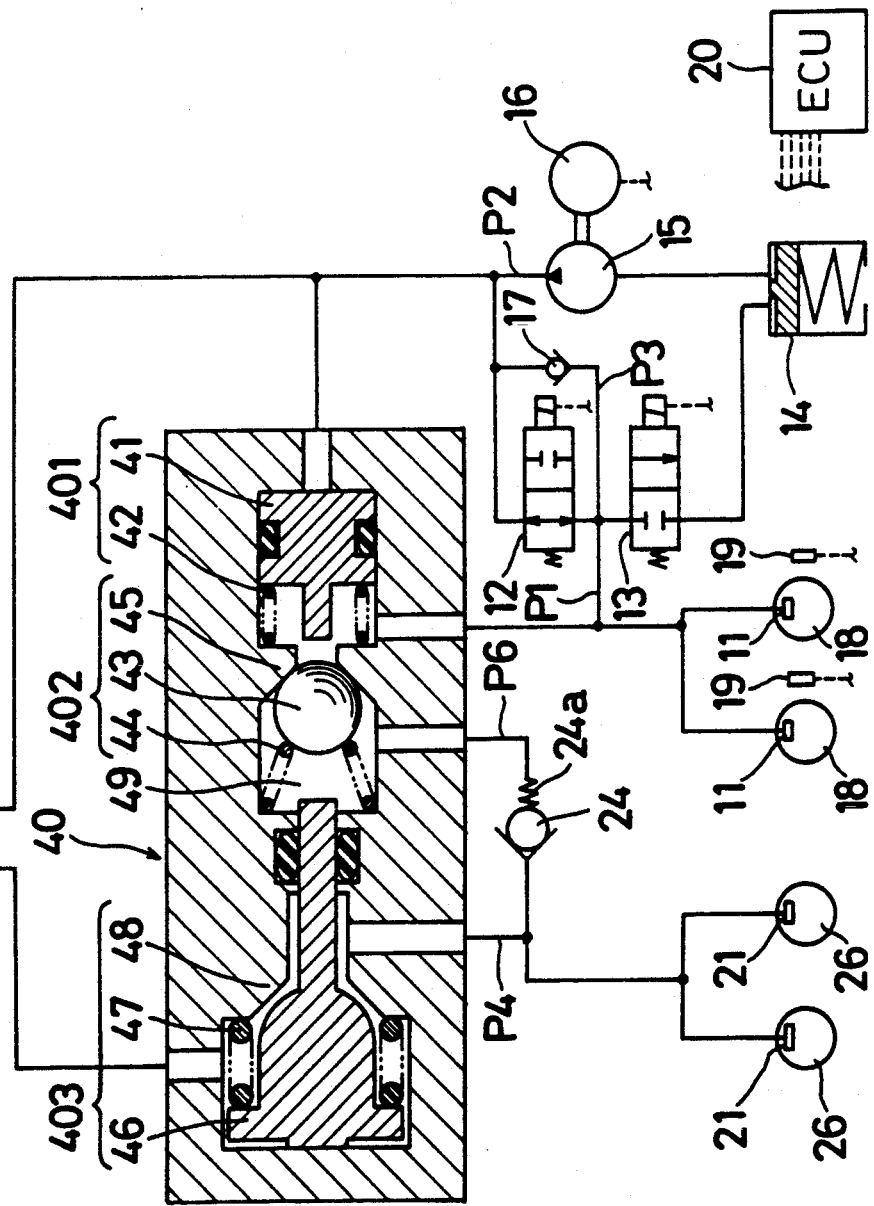
FIG. 4 is a circuit diagram showing a third embodiment of the present invention.

Referring now to FIG. 4, the third embodiment of the present invention will be explained. In the third embodiment, a regulating valve unit 40 is provided and a fail safe mechanism 401, 402 is installed in the regulating valve unit 40. Further, the front brake circuit P1 connects the right and left front wheels 18, and the rear brake circuit P4 connects the right and left rear wheels 26.

The regulating valve unit 40 includes a piston 41. The piston 41 is moved toward a ball valve 43 when a predetermined pressure, which is established by a spring 42, is exceeded by the pressure differential between the output pressure of the master cylinder (M/C) and the brake pressure in the front wheel cylinders 11. The piston 41 pushes the ball valve 43 when the piston 41 is moved toward the ball valve 43.

The regulating valve unit 40 also includes a one-way valve 402 which comprises the ball valve 43, a spring 44 and a valve seat 45. When the one-way valve 402 is opened, the brake pressure (W/Cf) is applied to a chamber 49. The one-way valve 402 can close the connecting circuit P6 and can prevent the brake fluid from flowing from the rear wheel cylinders 21 to the front wheel cylinders 11. Furthermore, the regulating valve unit 40 includes a normally open valve 403 which comprises a poppet valve 46, a spring 47 and a valve seat 48. The valve 403 is closed when a predetermined pressure, which is determined by the bias spring 47, is exceeded by the pressure between the output pressure (M/C) of the master cylinder 10 and the brake pressure (W/Cf) in the front wheel cylinders 11. The other features of the brake pressure controlling apparatus according to the third embodiment are the same as those features of the second embodiment. Therefore, a detailed explanation for those features of the third embodiment is omitted by using the same reference numerals as those used in the first two embodiments for corresponding elements.

In the third embodiment, while the front brake circuit P1 is in the normal condition, the piston 41 is moved toward the ball valve 43 when a predetermined pressure, determined by the springs 42, 44, is exceeded by the pressure differential between the output pressure (M/C) of the master cylinder 10 and the brake pressure (W/Cf) in the front wheel cylinders 11. When the piston 41 is moved toward the ball valve 43, the piston 41 separates the ball valve 43 from the valve seat 45. Then the brake pressure (W/Cf) is conducted to the chamber 49. The valve 403 is then closed, when a predetermined pressure, which is determined by the bias spring 47, is exceeded by the pressure differential between the output pressure (M/C) of the master cylinder 10 and the brake pressure (W/Cf) in the front wheel cylinders 11;

If the front brake circuit P1 is leaked, the piston 41 does not move since no output pressure (M/C) is applied to the piston 41. Therefore, the ball valve 43 is kept in the closed position. Thus, the poppet valve 46 does not move and is kept spaced from the valve seat 48. The rear brake circuit P4, therefore, is not closed by the valve 403 so that the output pressure (M/C) from the master cylinder 10 is applied to the rear wheel cylinders 21. Thus, the rear wheels 26 are reliably braked.

If the rear brake circuit P4 is leaked, the one-way valve unit 24 prevents the brake fluid in the front brake circuit P1 from leaking. Therefore, the front wheels 18 are reliably braked. The other operations are substantially the same as in the second embodiment and therefore, to simplify the description, a detailed explanation of those operations will be omitted.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations, changes and equivalents may be made by others without departing from the spirit of the present invention. Accordingly, it is expressly intended that all such variations, changes and equivalents which fall within the spirit and scope of the present invention as defined in the claims, be embraced thereby.

What is claimed is:

1. A pressure control apparatus having a master cylinder, a front wheel cylinder and a rear wheel cylinder, comprising:
    a first valve unit installed between the master cylinder and said front wheel cylinder for allowing brake fluid to flow from said master cylinder to said front wheel cylinder and for preventing brake fluid from flowing from said master cylinder to said front wheel cylinder;
    a reservoir unit for storing brake fluid supplied from one of said front and rear wheel cylinders;
    a second valve unit installed between said front wheel cylinder and said reservoir unit for permitting brake fluid to flow from said front wheel cylinder to said reservoir and for preventing brake fluid from flowing from said front wheel cylinder to said reservoir;
    a pump unit installed between the reservoir unit and the master cylinder for sending brake fluid from said reservoir unit to said master cylinder;
    a controlling unit for controlling said first and second valve units and said pump unit in accordance with vehicle conditions;
    a check valve installed between said front and rear wheel cylinders for allowing brake fluid to flow from said rear wheel cylinder to said front wheel cylinder; and
    a third valve unit installed between said master cylinder and said rear wheel cylinder for cutting off said rear wheel cylinder from said master cylinder while said controlling unit controls the operations of said front wheel cylinder.

2. The pressure control apparatus according to claim 1, including a connecting circuit for connecting the rear wheel cylinder to the front cylinder, said check valve being disposed in the connecting circuit.

3. The pressure control apparatus according to claim 1, wherein the third valve unit includes an electromagnetic valve controlled by the controlling unit.

4. The pressure control apparatus according to claim 1, wherein the third valve unit includes a regulating valve controlled by a pressure differential between an output pressure of the master cylinder and the brake pressure in the front wheel cylinder.

5. The pressure control apparatus according to claim 4, wherein the third valve unit includes a fail safe mechanism for maintaining the brake pressure in one of the front and the rear wheel cylinders.

6. The pressure control apparatus according to claim 4, wherein said regulating valve includes a ball valve, a valve seat and a first spring for urging the ball valve into sealing engagement with the valve seat.

7. The pressure control apparatus according to claim 6, wherein said regulating valve also includes a piston and a second spring for urging the piston away from the ball valve, said piston being adapted to move toward the ball valve to move the ball valve away from the valve seat when the pressure differential between the output pressure of the master cylinder and the brake pressure in the front wheel cylinder exceeds a force exerted by the first spring on the ball valve.

* * * * *